United States Patent
Wang et al.

(10) Patent No.: US 8,936,513 B2
(45) Date of Patent: Jan. 20, 2015

(54) SYSTEM AND METHOD FOR PLACING PLAYERS OF A MULTIPLAYER GAME IN A VIRTUAL WORLD

(75) Inventors: Ian Wang, San Francisco, CA (US); Erik Paul Bethke, Richmond, CA (US)

(73) Assignee: Zynga Inc., San Francisco, CA (US)

( * ) Notice: Subject to any disclaimer, the term of this patent is extended or adjusted under 35 U.S.C. 154(b) by 104 days.

(21) Appl. No.: 13/244,754

(22) Filed: Sep. 26, 2011

(65) Prior Publication Data

US 2012/0289342 A1 Nov. 15, 2012

Related U.S. Application Data

(63) Continuation of application No. 13/105,553, filed on May 11, 2011.

(51) Int. Cl.
*A63F 9/24* (2006.01)
*A63F 13/30* (2014.01)
*A63F 13/40* (2014.01)

(52) U.S. Cl.
CPC .................. *A63F 13/12* (2013.01); *A63F 13/10* (2013.01); *A63F 2300/534* (2013.01); *A63F 2300/5533* (2013.01); *A63F 2300/5566* (2013.01)
USPC .......................... 463/42; 463/1; 463/9; 463/25

(58) Field of Classification Search
USPC ............................................. 463/1, 9, 25, 42
See application file for complete search history.

(56) References Cited

U.S. PATENT DOCUMENTS

| | | | |
|---|---|---|---|
| 4,239,229 A | 12/1980 | Crossley | |
| 4,289,313 A | 9/1981 | Delamontagne | |
| 5,964,660 A * | 10/1999 | James et al. | 463/1 |
| 6,179,713 B1 * | 1/2001 | James et al. | 463/42 |
| 6,801,930 B1 | 10/2004 | Dionne et al. | |
| 2006/0235790 A1 | 10/2006 | Jung et al. | |
| 2007/0218997 A1 * | 9/2007 | Cho | 463/42 |
| 2008/0045343 A1 * | 2/2008 | Sauberman | 463/42 |
| 2009/0005140 A1 | 1/2009 | Rose et al. | |

(Continued)

FOREIGN PATENT DOCUMENTS

WO WO-2012154425 A1 11/2012

OTHER PUBLICATIONS

"Wikipedia VGA Planets". From Wikipedia, The Free Encylopedia. [online], [retrieved on Dec. 16, 2011]. Retrieved from the Internet <URL:http://en.wikipedia.org/wiki/VGA_Plaents>. 4 pages.*

(Continued)

*Primary Examiner* — Lawrence Galka
(74) *Attorney, Agent, or Firm* — Schwegman Lundberg & Woessner, P.A.

(57) ABSTRACT

A system, computer-readable storage medium including instructions, and a computer-implemented method for placing players of a multiplayer game in a virtual world are described. Territory for a player of the multiplayer game is placed in the virtual world for the multiplayer game. Territory for at least one other player is placed adjacent to the territory of the player in the virtual world. The player is determined to have entered the territory for the at least one other player. At least one in-game task is assigned to the player based on an in-game state of the player and an in-game state of the at least one other player.

23 Claims, 6 Drawing Sheets

(56) References Cited

U.S. PATENT DOCUMENTS

2011/0053693 A1* 3/2011 Wright .......................... 463/42
2012/0289339 A1 11/2012 Wang et al.

OTHER PUBLICATIONS

"Donovan's VGA Planets Hosting". From http://www.donovansvgap.com/. [online], [retrieved Dec. 16, 2011]. Retrieved from the Internet <URL:http://www.donovansvgap.com/hosting/hosting.htm>. 14 pages.*
"Donovan's VGA Planets Movement". From http://www.donovansvgap.com/. [online], [retrieved Dec. 16, 2011]. Retrieved from the Internet <URL:http://www.donovansvgap.com/help/movement.htm>. 4 pages.*
"VGA Planets Host Doc1 Missions". From http://www.vgaplanets.com. [online], [retrieved Dec. 16, 2011]. Retrieved from the Internet <URL:http://www.vgaplanets.com/hostdoc1.htm>. 12 pages.*
"Circus Maximus Team Games". From http://www.circus-maximus.com. [online], [retrieved Dec. 16, 2011]. Retrieved from the Internet <URL:http://www.circus-maximus.com/team.htm>. 4 pages.*
"Circus Maximus Forum Team Games". From http://www.circus-maximus.com. [online], [retrieved Dec. 16, 2011]. Retrieved from the Internet <URL:http://www.circus-maximus.com/forums/viewtopic.php?f=305&t=3973>. 8 pages.*
"Circus Maximus Computer Players". From http://www.circus-maximus.com. [online], [retrieved Dec. 16, 2011]. Retrieved from the Internet <URL:http://www.circus-maximus.com/dl-cp.htm>. 3 pages.*
"Wikipedia starcraft 2". From Wikipedia, The Free Encylopedia. [online], [retrieved on May 10, 2012]. Retrieved from the Internet <URL:http://en.wikipedia.org/wiki/StarCraft_II:_Wings_of_Liberty>. 16 pages.*
"Strategy informer SC2 review". From http://www.strategyinformer.com. [online], [retrieved May 10, 2012]. Retrieved from the Internet <URL:http://www.strategyinformer.com/pc/starcraft2/reviews.html>. 12 pages.*
"SC2 beta FAQ". From http://www.starcraft-source.com. [online], [retrieved May 10, 2012]. Retrieved from the Internet <URL:http://www.starcraft-source.com/article/news/view/?id=446>. 5 pages.*
"Battlenet overview". From http://us.battle.net. [online], [retrieved May 10, 2012]. Retrieved from the Internet <URL:http://us.battle.net/sc2/en/game/guide/bnet-overview>. 8 pages.*
"Liquidpedia II High Orbit". From http://wiki.teamliquid.net. [online], [retrieved May 10, 2012]. Retrieved from the Internet <URL:http://wiki.teamliquid.net/starcraft2/High_Orbit>. 2 pages.*
"Liquidpedia II Outpost". From http://wiki.teamliquid.net. [online], [retrieved May 10, 2012]. Retrieved from the Internet <URL:http://wiki.teamliquid.net/starcraft2/Outpost>. 2 pages.*
"Sc2mod editor tutorial". From http://www.sc2mod.com. [online], [retrieved May 10, 2012]. Retrieved from the Internet <URL:http://www.sc2mod.com/board/index.php?page=Thread&threadID=102>. 13 pages.*
"Sc2mod editor screenshot". From http://www.sc2mod.com. [online], [retrieved May 10, 2012]. Retrieved from the Internet <URL:http://www.sc2mod.com/board/index.php?page=Attachment&attachmentID=98&embedded=1>. 1 page.*
"Wiki team liquid minimap". From http://wiki.teamliquid.net. [online], [retrieved May 2, 2014]. Retrieved from the Internet <URL:http://wiki.teamliquid.net/starcraft2/Minimap>. 3 pages.*
"Wiki team liquid sight". From http://wiki.teamliquid.net. [online], [retrieved May 1, 2014]. Retrieved from the Internet <URL:http://wiki.teamliquid.net/starcraft2/Sight>. 1 page.*

"Stackexchange sc2 frustum". From http://gaming.stackexchange.com. [online], [retrieved May 2, 2014]. Retrieved from the Internet <URL:http://gaming.stackexchange.com/questions/25622/why-is-the-starcraft-2-minimap-not-a-rectangle>. 3 pages.*
"Alliances", [online]. Retrieved from the internet: <URL:http://www.donovansvgap.comlhelp/alliance.htm>, (Accessed Dec. 16, 2011), 3pgs.
"U.S. Appl. No. 13/105,553, Examiner Interview Summary mailed Mar. 7, 2012", 3 pgs.
"U.S. Appl. No. 13/105,553, Non Final Office Action mailed Jan. 9, 2012", 23pgs.
"Friendly Codes", [online]. Retrieved from the internet <:URL:http://www.donovansvgap.comlhelp/friendlycodes.htm>, (Accessed Dec. 16, 2011), 2pgs.
"U.S. Appl. No. 13/105,553, Response filed Sep. 24, 2012 to Final Office Action mailed May 24, 2012", 13 pgs.
"Age of Wonders II Heaven Map Events Guide", [Online]. Retrieved from the Internet: <http://aow2.heavengames.com/library.scenariodesign/ttevents.shtml>, (Accessed May 8, 2012), 13 pgs.
"Age of Wonders II Manual", Take 2 Interactive, (May 8, 2012), 12 pgs.
"Age of Wonders II:The Wizard's Throne", [Online]. Retrieved from the Internet<http://en.wikipedia.org/wiki/Age_of_Wonders_II:_The_Wizard%27s-Throne>, (Accessed May 8, 2012), 4 pgs.
"AOW2 Heaven Map Events Appendices", [Online]. Retrieved from the Internet: <http://aow2.heavengames.com/library/scenariodesign/mapeventbasicsapp.shtml>, (Accessed May 8, 2012), 2 pgs.
"U.S. Appl. No. 13/105,553, Examiner Interview Summary mailed Aug. 27, 2012", 3 pgs.
"U.S. Appl. No. 13/105,553, Final Office Action mailed May 24, 2012", 21 pgs.
"Gamer's Temple AOW2 Review", [Online]. Retrieved from the Internet: <http://www.gamerstemple.com/review.asp?r=66>, (Accessed May 8, 2012), 3 pgs.
"International Application Serial No. PCT/US2012/035470, International Search Report mailed Jul. 13, 2012", 4 pgs.
"International Application Serial No. PCT/US2012/035470, Written Opinion mailed Jul. 13, 2012", 12 pgs.
"Lord of the Rings: The Confrontation—Board Game Geek", [Online]. Retrieved from the Internet: <http://boardgamegeek.com/image/98204/lord-of-the-rings-the-confrontation?size=large>, (Accessed May 8, 2012), 2 pgs.
"Lord of the Rings: The Confrontation—Board Game Geek", [Online]. Retrieved from the Internet: <http://boardgamegeek.com/boardgame/3201/lord-of-the-rings-the-confrontation>, 5 pgs.
"Map Event Basics Part 1: Introduction and Getting Started", [Online]. Retrieved on the Internet: <http://www.aow2.heavengames.com/library.scenariodesign/mapeventbasicsi.shtml>, (Accessed May 8, 2012), 2 pgs.
"Map Event Basics Part 2: The Event Seettings Tab—Event Settings and Trigger Settings", Online]. Retrieved from the Internet: <http://aow2.heavengames.com/library/scenariodesign/mapeventbasicsappii.shtml>, (Accessed May 8, 2012), 3 pgs.
"Map Event Basics Part 3: The Event Settings Tab—Conditions Settings", Online]. Retrieved from the Internet: <http://aow2.heavengames.com/library/scenariodesign/mapeventbasicsappiii.shtml>, (Accessed May 8, 2012), 3 pgs.
"Map Event Basics Part 4: The Event Settings Tab—The Conditions Tab", [Online]. Retrieved from the Internet: <http://aow2.heavengames.com/library/scenariodesign/mapeventbasicsiv.shtml>, (Accessed May 8, 2012), 3 pgs.

* cited by examiner

SYSTEM AND METHOD FOR PLACING PLAYERS OF A MULTIPLAYER GAME IN A VIRTUAL WORLD

CLAIM OF PRIORITY

This application is a continuation of and claims the benefit of priority under 35 U.S.C. §120 to U.S. patent application Ser. No. 13/105,553, filed on May 11, 2011, which is hereby incorporated by reference herein in its entirety.

TECHNICAL FIELD

The disclosed embodiments relate generally to a system and method for placing players of a multiplayer game in a virtual world.

BACKGROUND

A multiplayer game allows multiple players to play with or play against each other. The placement of players affects gameplay. For example, in strategy games, players that are placed near resources may have an economic advantage whereas players that are placed near natural defenses may have a defensive advantage. Similarly, in a card game, the placement of players around a card table affects the order that cards are dealt to the players.

BRIEF DESCRIPTION OF THE DRAWINGS

The embodiments disclosed in the present disclosure are illustrated by way of example, and not by way of limitation, in the figures of the accompanying drawings. Like reference numerals refer to corresponding parts throughout the drawings.

DESCRIPTION OF EMBODIMENTS

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for placing players of a multiplayer game in a virtual world.

Figure 1:
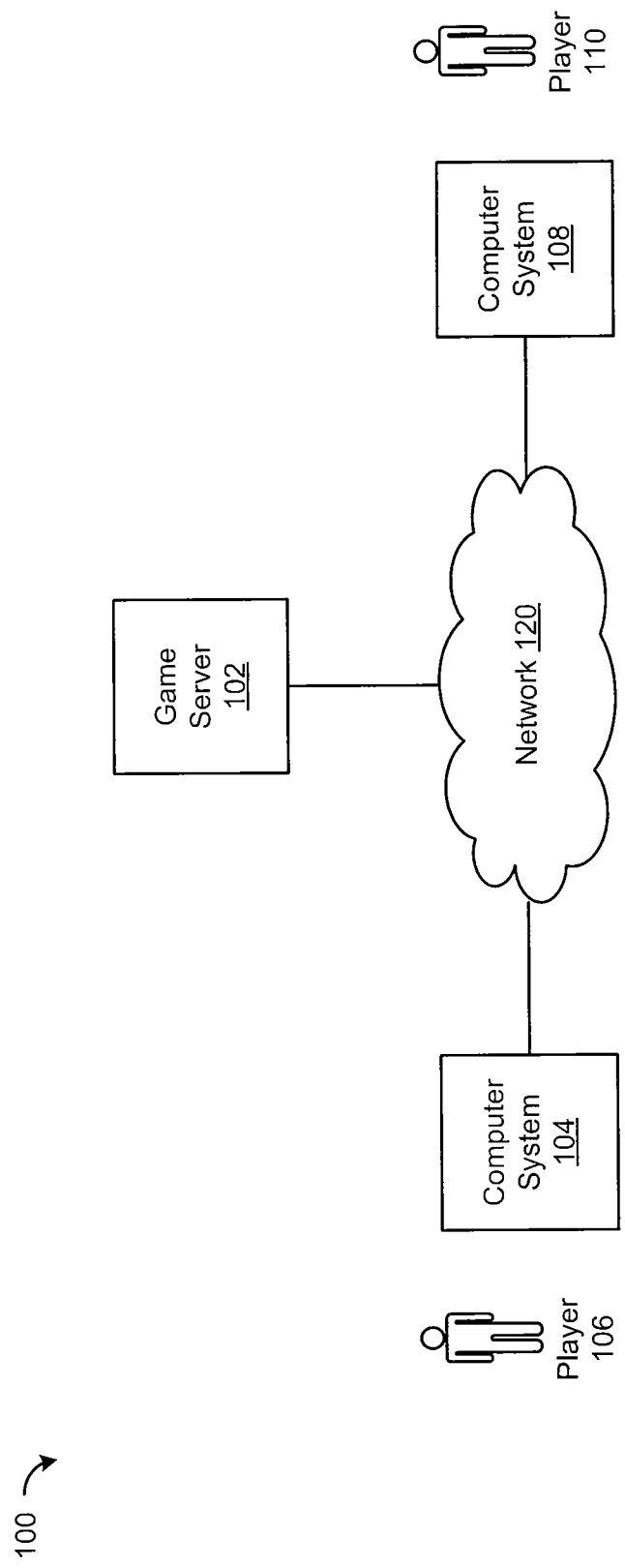
FIG. 1 is a block diagram illustrating a network system, according to some embodiments.

FIG. 1 is a block diagram illustrating a network system 100, according to some embodiments. The network system 100 includes a network 120. Network 120 can generally include any type of wired or wireless communication channel capable of coupling together computing nodes. This includes, but is not limited to, a local area network (LAN), a wide area network (WAN), or a combination of networks. In some embodiments, network 120 includes the Internet.

As illustrated in FIG. 1, a game server 102, a computer system 104, and a computer system 108 are coupled to network 120 and may communicate with each other via network 120.

The game server 102 may be a server for a game publisher. The network system 100 may include a game server for each of a plurality of game publishers. In some embodiments, the game server 102 places players of a multiplayer game hosted by the game server 102 in a virtual world of the multiplayer game. These embodiments are described in more detail below with respect to FIGS. 2-6.

The computer systems 104 and 108 may include a laptop computer system, a desktop computer system, a mobile phone, a smart phone, a personal digital assistant (PDA), a gaming console, and a set top box. A player 106 may use the computer system 104 to play a game hosted by the game server 102. Similarly, a player 110 may use the computer system 108 to play a game hosted by the game server 102.

Note that although FIG. 1 shows one instance for each of the game server 102, the computer system 104, and the computer system 108, multiple computer systems and game servers may be present in the network system 100. For example, the game server 102 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.). Similarly, the network system 100 may include a plurality of computer systems for each player of the multiplayer game.

Also note that although the embodiments described herein refer to the computer system 104, the computer system 108, and the game server 102, the embodiments may be applied to multiple computer systems and game servers.

Figure 2:
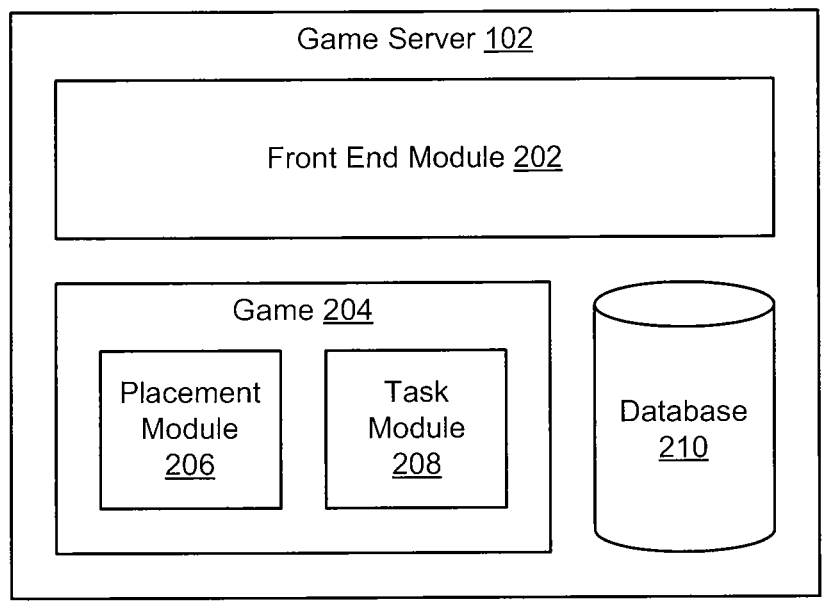
FIG. 2 is a block diagram illustrating a game server, according to some embodiments.

FIG. 2 is a block diagram illustrating the game server 102, according to some embodiments. The game server 102 includes a front end module 202, a game 204, and a database 210. The front end module 202 transmits data and/or commands to and receives data and/or commands from the computer system 104 and the computer system 108. The game 204 includes server-side code for the game 204 and client-side code for the game 204. The game 204 also includes a placement module 206 and a task module 208. The game 204 may include network-based social games (e.g., games played on a social networking website, multiplayer games, etc.). The placement module 206 places territories of players in a virtual world of the game 204, as described herein. Note that a territory of a player includes areas of the virtual world of the multiplayer game that the player controls (e.g., the player may own the areas). The territory of the player may include assets for the player (e.g., buildings, resources, citizens, etc.). The task module 208 assigns tasks to players as described herein. The database 210 may store in-game states of players of the game 204. The in-game state of a player of the game 204 may include in-game tasks completed by the player, resources (e.g., money, supplies, food) of the player, buildings for the player, friends of the player, guild memberships of the player, opponents of the player, guilds for opponents of the player, a boundary of the territory for the player, and the like.

Figure 3:
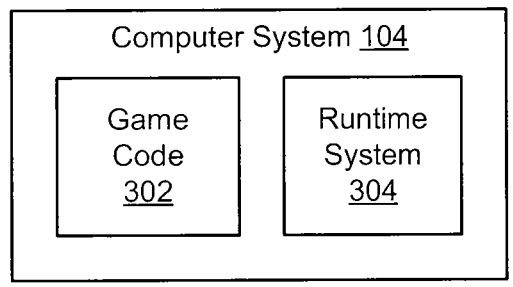
FIG. 3 is a block diagram illustrating a computer system, according to some embodiments.

FIG. 3 is a block diagram illustrating the computer system 104, according to some embodiments. The computer system 104 includes game code 302 and a runtime system 304. The game code 302 (e.g., the client-side game code of the game 204) is received from the game server 102. The runtime system 304 (e.g., a Java runtime system, a Flash runtime system, etc.) executes the game code 302 to generate a game interface for the player 106 to play the game 204. In some embodiments, the runtime system 304 is a runtime system provided by a web browser. Note that the computer system 108 may be similar to the computer system 104.

Placing Players in a Virtual World

Players of a multiplayer game typically perform in-game tasks in a virtual world for the multiplayer game. These in-game tasks may benefit the player of the multiplayer game, aid other players of the multiplayer game, and/or hinder other players of the multiplayer game. For example, a first player may be asked to provide assets to a second player and to sabotage assets of a third player. Similarly, the first player may be asked to obtain particular assets in the virtual world.

For a multiplayer game such as a network-based social game (e.g., a game that is played on or via a social networking website), a game interface for the multiplayer game displayed on a computer system for the player is typically limited by the computational resources and runtime system of the computer system for the player. For example, when the multiplayer game is played in a web browser on the computer system for the player, the multiplayer game is limited to the capabilities of the runtime system provided by the web browser (e.g., Java, Flash) and/or the computational resources of the computer system. To account for limited computational resources, the multiplayer game may only display assets and/or territory for one player at a time. In order to provide access to other players of the multiplayer game, the multiplayer game may generate user interface controls (e.g., a "visit" button) in the game interface so that the player can access territories and/or assets of other players. A player of a multiplayer game may enter territory and/or access assets for other players by activating the user interface controls. The game interface may then display the territory for the second player. However, this type of interaction with other players of the multiplayer game does not convey the idea that the players of the multiplayer game are playing in a virtual world.

To address these deficiencies, some embodiments place territories for players of a multiplayer game adjacent to each other in a virtual world. In these embodiments, the multiplayer game displays the territories for other players in the game interface and/or displays user interface elements (e.g., buildings, symbols, text, avatars) corresponding to territories for other players that are adjacent to the territory for the player in the game interface. These embodiments are described in more detail below with respect to FIGS. 4-6.

The following discussion refers to the player 106 as a player of the multiplayer game. However, the embodiments described herein may be applied to any player of the multiplayer game.

Figure 4:
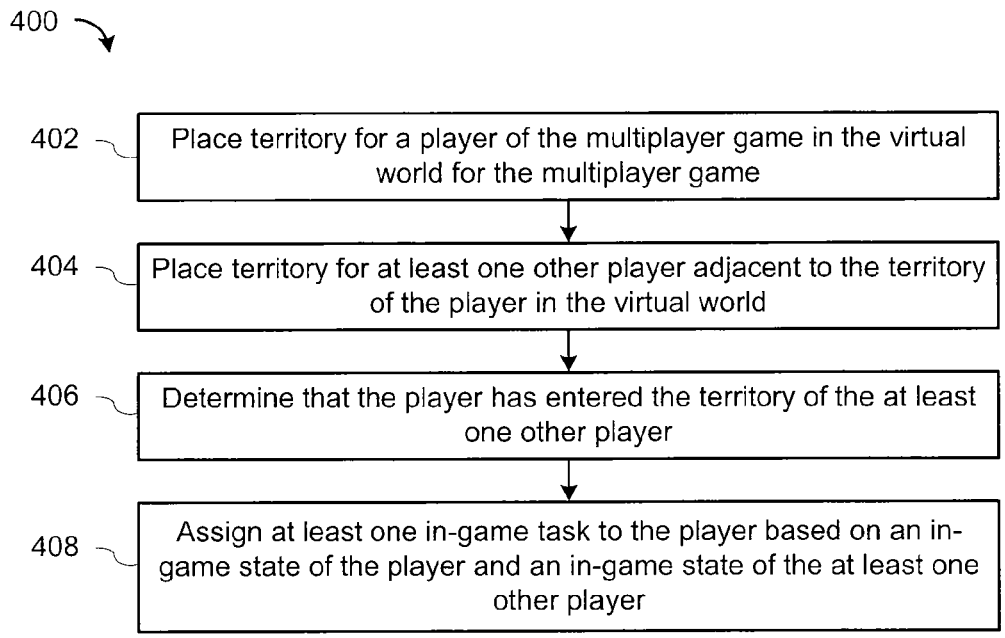
FIG. 4 is a flowchart of a method for placing players of a multiplayer game in a virtual world, according to some embodiments.

FIG. 4 is a flowchart of a method 400 for placing players of a multiplayer game in a virtual world, according to some embodiments. The placement module 206 places (402) territory for a player (e.g., the player 106) of the multiplayer game in the virtual world for the multiplayer game. In some embodiments, the multiplayer game is a network-based social game (e.g., a multiplayer game played on or via a social networking website).

The placement module 206 places (404) territory for at least one other player (e.g., the player 110) adjacent to the territory of the player (e.g., the player 106) in the virtual world. The at least one other player may include an in-game friend of the player, a guild controlled by the player and at least one in-game friend of the player, an opponent of the player, a guild controlled by at least one opponent of the player, and at least one non-player character. The virtual world may include territory for any or all of these players. Furthermore, the virtual world may include contested territory that is not part of the territory of any of the aforementioned players.

In some embodiments, the at least one other player includes at least one most-visited player for the player (e.g., the player 106). For example, the at least one other player may be a most-visited in-game friend or opponent of the player. In some embodiments, the at least one other player includes at least one player selected by the player (e.g., the player 106).

Figure 6A:
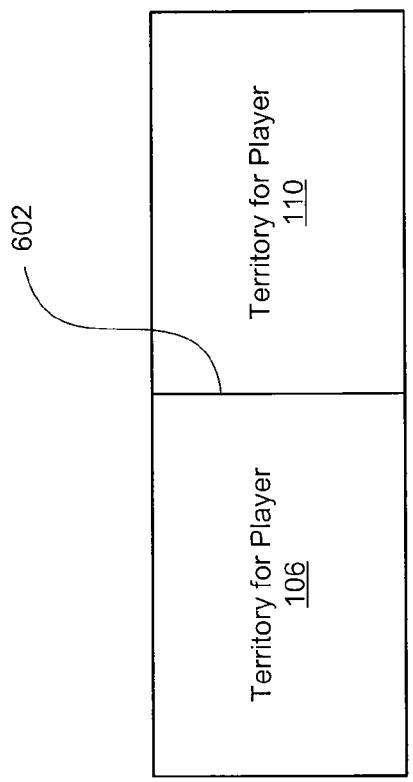
FIG. 6A illustrates an exemplary placement of players in a multiplayer game, according to some embodiments.
Figure 6B:
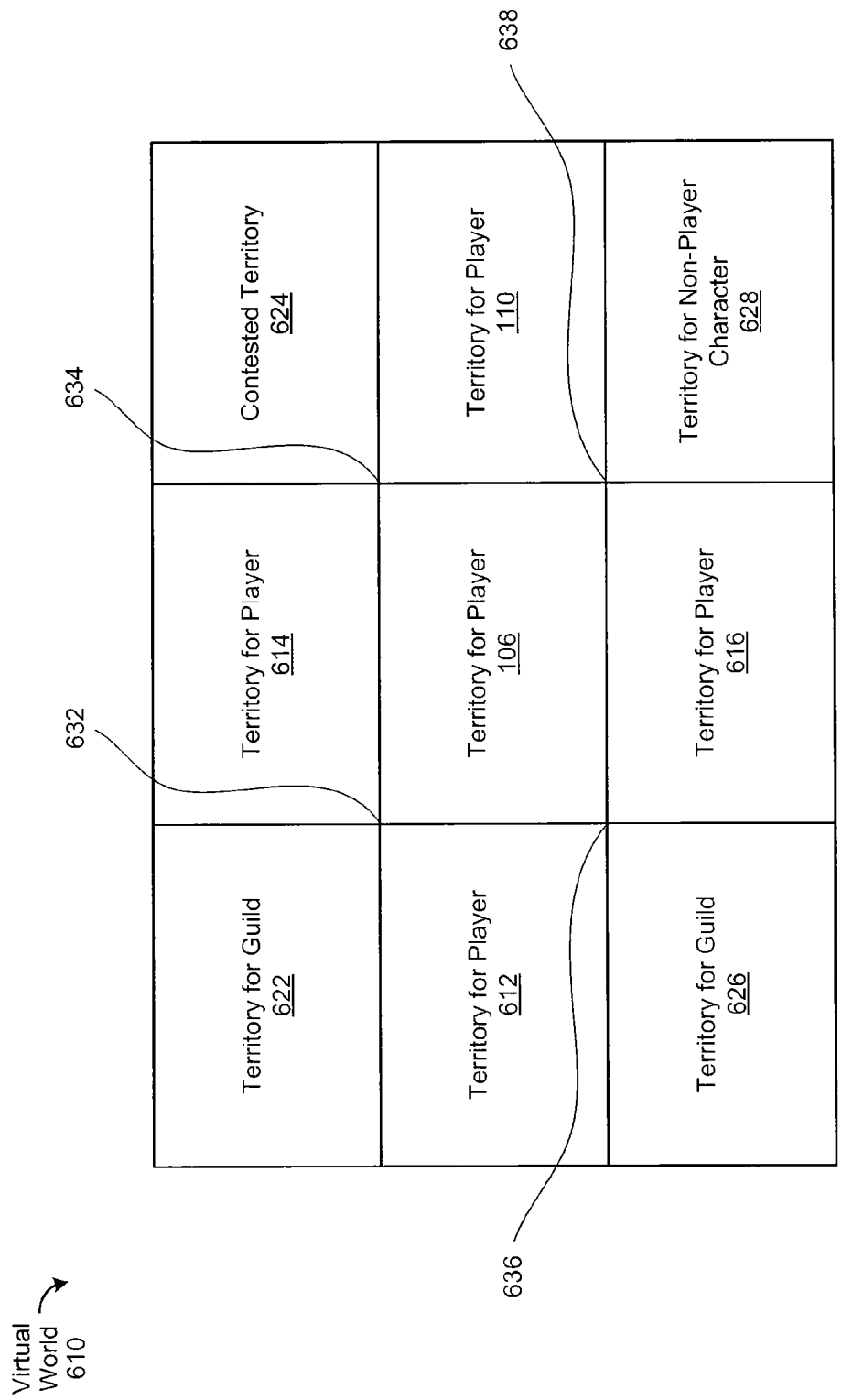
FIG. 6B illustrates another exemplary placement of players in a multiplayer game, according to some embodiments.

In some embodiments, a boundary for the territory for the player (e.g., the player 106) and a boundary for the territory for the at least one other player (e.g., the player 110) are rectangular or substantially rectangular. These embodiments are illustrated in FIGS. 6A and 6B, which illustrate exemplary placements of players in the multiplayer game, according to some embodiments. FIG. 6A illustrates a virtual world 600 in which territory for the player 110 is placed adjacent to territory for the player 106. In some embodiments, the boundary for the territory for the player (e.g., the player 106) and the boundary for the territory for the at least one other player (the player 110) share a common edge (e.g., edge 602). Note that the boundaries of the territories for the player 106 and the boundary of the territory for the player 110 do not need to be the same size. Also note that the common edge does not need to overlap the whole edge of the boundaries (e.g., the territory for the player 106 and the territory for the player 110 may be offset vertically in FIG. 6A).

In some embodiments, the boundary for the territory for the player and the boundary for the territory for the at least one other player share a common vertex. FIG. 6B illustrates a virtual world 610 in which territory for the player 110, territory for a player 612, territory for a player 614, territory for a player 616, territory for a guild 622, territory for a guild 626, a contested territory 624, and territory for a non-player character 628 are adjacent to the territory for the player 106. As illustrated in FIG. 6B, the territory for the guild 622 is adjacent to the territory for the player 106 because the territory for the guild 622 and the territory for the player 106 share a common vertex 632. Similarly, the contested territory 624, the territory for the guild 626, and the territory for the non-player character 628 are adjacent to the territory for the player 106 because these territories share common vertices 634, 636, and 638, respectively, with the territory for the player 106.

In some embodiments, a territory includes assets of a player. For example, the territory for the player 106 may include assets such as buildings, resources (e.g., trees, water, gold), citizens, and the like. The multiplayer game typically displays the assets of the territory for the player 106. However, the multiplayer game may or may not display the assets of the territory for the at least one other player (e.g., the player 110) depending on factors including, but not limited to, computational resources of the game server 102 and computational resources of the computer system 104. When the multiplayer game does not display assets in the territory for the at least on other player, the multiplayer game may display user interface elements (e.g., buildings, symbols, text, avatars) to indicate the locations of the territory for the at least one other player. The multiplayer game may also display user interface elements (e.g., buildings, symbols, text, avatars) that the player 106 may use to enter the territory for the at least one other player.

Note that the territory for the player and the territory for the at least one other player may be placed so that each player's view of the virtual world is consistent. For example, if the territory for the player 106 is placed to the left of the territory for the player 110, the game interface for the player 106 indicates that the territory for the player 110 is to the right of the territory for the player 106 (e.g., the territory for the player 106 is displayed to the left of the territory for the player 110 in the game interface for the player 106). Similarly, the game interface for the player 110 indicates that the territory for the player 106 is to the left of the territory for the player 110 (e.g., the territory for the player 110 is displayed to the right of the territory for the player 106 in the game interface for the player 110).

Also note that although the discussion above refers to a rectangular boundary, the boundaries for the territories (e.g., the territory for the player 106, the territory for the player 110, the territory for the guild 626) may be any shape. For example, the boundaries may be may be any polygon or amorphous shape. Moreover, note that the boundaries may be separated by territory that is not owned or occupied by players or guilds.

Furthermore, note that the discussion above illustrates an example placement of territories with respect to a player of a game (e.g., the player 106). In general, territories of player's guilds, territories of other players, territories of non-player characters, and/or contested territories may be placed in any position relative to the territory for the player of the game (e.g., the player 106). For example, in FIG. 6B, the territory for the player 110 may be placed to the left of the territory for the player 106, the territory for the player 612 may be placed to the right of the territory for the player 106, and so on.

Returning to FIG. 4, the task module 208 determines (406) that the player (e.g., the player 106) has entered the territory of the at least one other player (e.g., the player 110). In some embodiments, the player enters the territory for the at least one other player by activating a user interface element. The user interface element may include a building, text corresponding to a name of the at least one other player, an avatar corresponding to the at least one other player, and the like. In these embodiments, when the player enters the territory for the at least one other player, only the territory for the at least one other player is displayed in the game interface. In other words, the game interface for the multiplayer game only displays the territory and/or assets of the player that the player is currently in.

In some embodiments, the player enters the territory for the at least one other player by crossing a boundary between the territory for the player and the territory for the at least one other player. For example, the player may command a character of the player to cross a boundary of the territory for the at least one other player. Alternatively, the player may scroll the game interface to display the territory for the at least one other player. In these embodiments, when the game interface display at least a portion of the territory for the player (e.g., the player 106) and at least a portion of the territory for the at least one other player (e.g., the player 110), the territories and/or assets in both territories may be displayed. In other words, the multiplayer game displays territories and/or assets in territories that are viewable in the game interface. For example, in FIG. 6B, the game interface may overlap a portion of the territory for the guild 622, a portion of the territory for the player 614, a portion of the territory for the player 612, and a portion of the territory for the player 106. Thus, in this example, these portions of the territories and/or assets in the portions of the territories are displayed in the game interface.

Returning to FIG. 4, the task module 208 assigns (408) at least one in-game task to the player based on an in-game state of the player and an in-game state of the at least one other player.

In embodiments where the at least one other player includes an in-game friend of the player (e.g., the player 610, the player 614, the player 616 in FIG. 6B), the in-game task includes one or more of constructing an asset for the in-game friend of the player, managing an asset for the in-game friend of the player, providing an asset to the in-game friend of the player, and any task that involves interaction with assets and/or territory of the in-game friend.

In embodiments where the at least one other player includes a guild controlled by the player and at least one in-game friend of the player (e.g., the guild 622 in FIG. 6B), the in-game task includes one or more of constructing an asset for the guild controlled by the player and the at least one in-game friend of the player, managing an asset for the guild controlled by the player and the at least one in-game friend of the player, providing an asset for the guild controlled by the player and the at least one in-game friend of the player, and any task that involves interaction with assets and/or territory of the guild controlled by the player and the at least one in-game friend of the player.

In embodiments where the at least one other player includes an opponent of the player, the in-game task include one or more of sabotaging an asset of the opponent of the player, stealing an asset of the opponent of the player, attacking an asset of the opponent of the player, and any task that involves interaction with assets and/or territory of the opponent of the player.

In embodiments where the at least one other player includes a guild controlled by at least one opponent of the player (e.g., the guild 626 in FIG. 6B), the in-game task includes one or more of sabotaging an asset of the guild controlled by the at least one opponent of the player, stealing an asset of the guild controlled by the at least one opponent of the player, attacking an asset of the guild controlled by the at least one opponent of the player, and any task that involves interaction with assets and/or territory of the guild controlled by the at least one opponent of the player.

In embodiments where the at least one other player includes at least one non-player character (e.g., the non-player character 628 in FIG. 6B), the in-game task includes one or more of constructing an asset for the at least one non-player character, managing an asset for the at least one non-player character, and providing an asset for the at least one non-player character.

Figure 5:
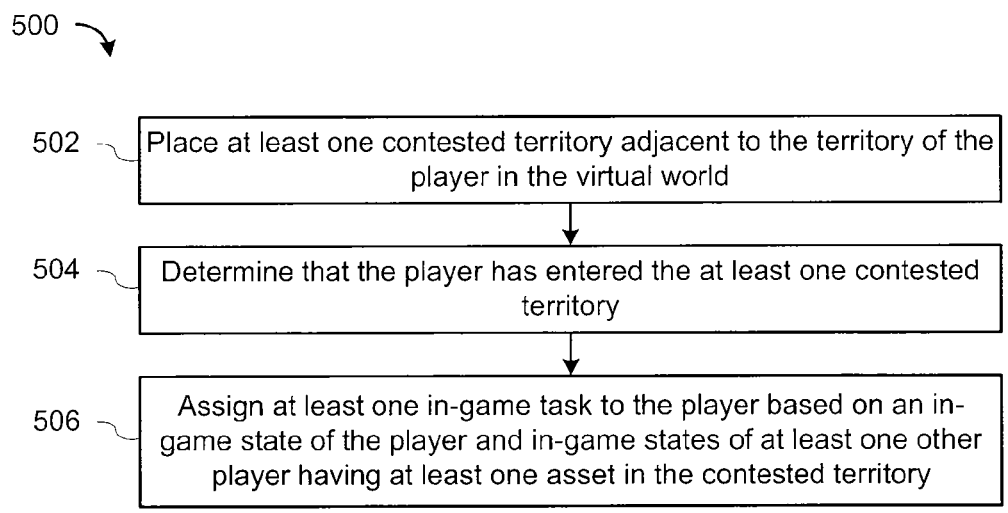
FIG. 5 is a flowchart of a method for placing contested territory in the virtual world, according to some embodiments.

FIG. 5 is a flowchart of a method 500 for placing contested territory in the virtual world, according to some embodiments. The placement module 206 places (502) at least one contested territory adjacent to the territory of the player in the virtual world. For example, the contested territory 624 is placed adjacent to the territory for the player 106. The placement module 206 determines (504) that the player has entered the at least one contested territory. The task module 208 assigns (506) at least one in-game task to the player based on an in-game state of the player and an in-game state of at least one other player having at least one asset in the contested territory. The in-game task may include one or more of constructing an asset for the player in the contested territory, managing an asset for the player in the contested territory, constructing an asset for a guild controlled by the player and at least one in-game friend of the player in the contested territory, managing an asset for a guild controlled by the player and at least one in-game friend of the player in the contested territory, sabotaging an asset of at least one opponent of the player in the contested territory, stealing an asset of at least one opponent of the player in the contested territory, attacking an asset of at least one opponent of the player in the contested territory, sabotaging an asset of a guild controlled by at least one opponent of the player in the contested territory, stealing an asset of a guild controlled by at least one opponent of the player in the contested territory, and attacking an asset of a guild controlled by at least one opponent of the player in the contested territory.

Exemplary Machine

Figure 7:
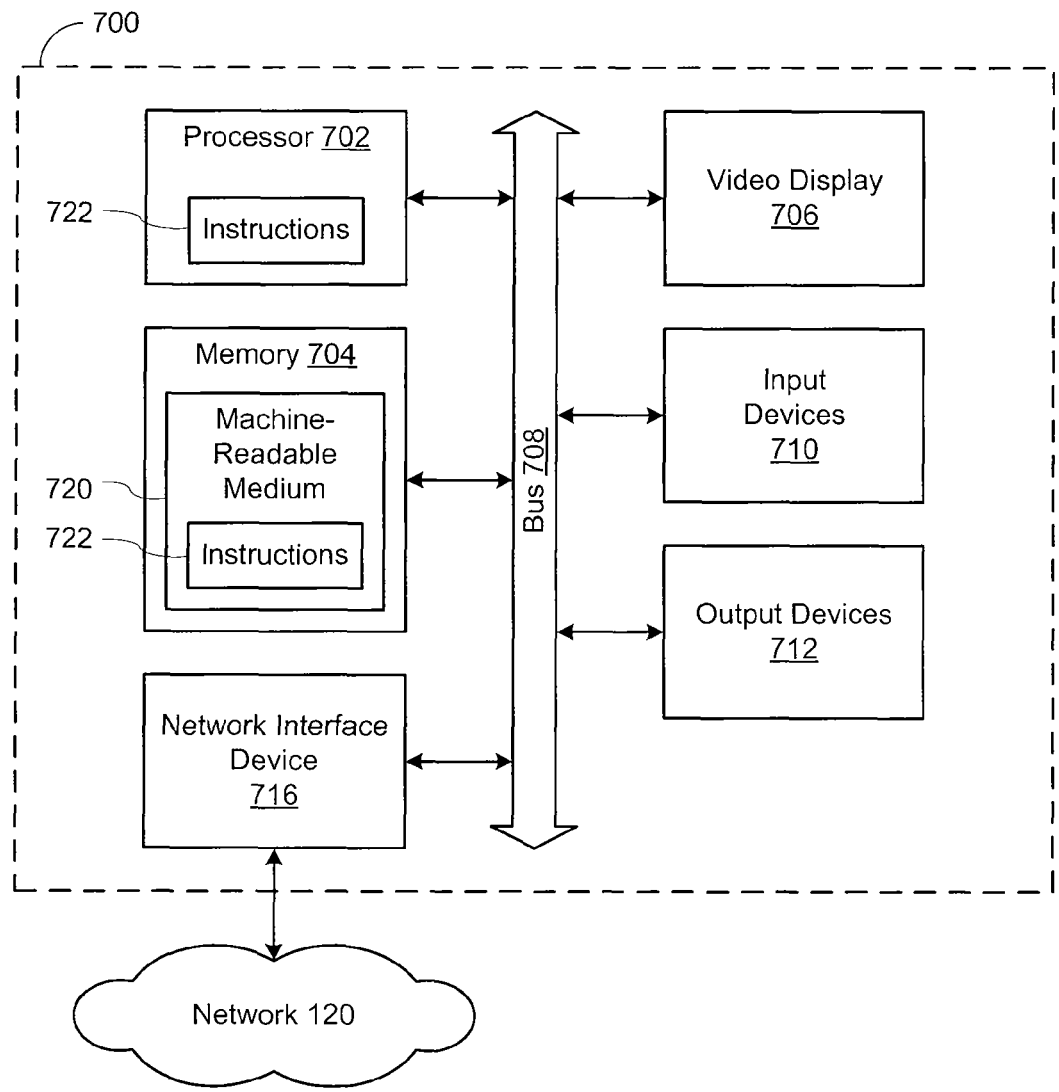
FIG. 7 is a block diagram illustrating an exemplary machine, according to some embodiments.

FIG. 7 depicts a block diagram of a machine in the example form of a computer system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The computer system 700 may include, but is not limited to, a desktop computer system, a laptop computer system, a server, a mobile phone, a smart phone, a personal digital assistant (PDA), a gaming console, a portable gaming console, a set top box, a camera, a printer, a television set, or any other electronic device.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 700 includes a processor 702 (e.g., a central processing unit (CPU), a graphics processing unit (GPU) or both), and memory 704, which communicate with each other via bus 708. Memory 704 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 704 may optionally include one or more storage devices remotely located from the computer system 700. The computer system 700 may further include a video display unit 706 (e.g., a plasma display, a liquid crystal display (LCD) or a cathode ray tube (CRT)). The computer system 700 also includes input devices 710 (e.g., keyboard, mouse, trackball, touchscreen display, etc.), output devices 712 (e.g., speakers), and a network interface device 716. The aforementioned components of the computer system 700 may be located within a single housing or case (e.g., as depicted by the dashed lines in FIG. 7). Alternatively, a subset of the components may be located outside of the housing. For example, the video display unit 706, the input devices 710, and the output devices 712 may exist outside of the housing, but be coupled to the bus 708 via external ports or connectors accessible on the outside of the housing.

Memory 704 includes a machine-readable medium 720 on which is stored one or more sets of data structures and instructions 722 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 722 may also reside, completely or at least partially, within memory 704 and/or within the processor 702 during execution thereof by computer system 700, with memory 704 and processor 702 also constituting machine-readable, tangible media.

The data structures and instructions 722 may further be transmitted or received over a network 120 via network interface device 716 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 702 configured using software, the processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software, code, and/or instructions stored in a machine-readable medium) or permanently configured to perform the relevant operations. Whether temporarily or permanently configured, such processors 702 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 702 or processor-implemented (or computer-implemented) modules. Similarly, at least some of the operations of a method may be governed by instructions that are stored in a computer readable storage medium and executed by one or more processors 702 or processor-implemented (or computer-implemented) modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A computer-implemented method comprising:
   placing, by execution of a placement module in a processor of the computer, a territory for a first player of a computer-implemented multiplayer game in a virtual world for the multiplayer game, wherein instructions for the placement module are provided by the computer-implemented multiplayer game, and wherein a placement location of the territory for the first player is determined by the placement module independent of input from any player of the multiplayer game, wherein the virtual world comprises a plurality of territories arranged in a common game board layout for respective players of the multiplayer game;
   receiving input from the first player in an interface of the computer-implemented multiplayer game, the input indicating selection of at least one other selected player from a defined set of one or more other players for association with territory adjacent to the territory of the first player; and
   placing, by execution of the placement module, a territory for the at least one other selected player adjacent to the territory of the first player in the virtual world, wherein a placement of the territory for the at least one other selected player shares at least one common boundary with the territory for the first player, and wherein a placement location of the territory for the at least one other selected player is determined by the placement module independent of input from any player of the multiplayer game;
   wherein a first layout of accessible territories in the virtual world generated for the first player in the multiplayer game is unique to the first player, wherein a set of territories for the one or more other players accessible to the first player in the first layout of accessible territories in the virtual world is determined from in-game relationships established between the first player and the one or more other players, wherein the territory for the first player in the virtual world is inaccessible to players without an in-game relationship with the first player;
   wherein a second layout of accessible territories in the virtual world respectively generated for each of the at least one other selected player in the multiplayer game is unique to each of the at least one other selected player, wherein a set of territories accessible to each of the at least one other selected player in the second layout of accessible territories in the virtual world is determined respectively from in-game relationships established between the at least one other selected player and the one or more other players; and
   wherein the second layout of accessible territories in the virtual world generated for each of the at least one other selected player provides placements in the virtual world that are consistent with the first layout of accessible territories in the virtual world generated for the first player, based on the common game board layout of the virtual world.

2. The computer-implemented method of claim 1, wherein the at least one other selected player includes an in-game friend of the first player.

3. The computer-implemented method of claim 2, further comprising automatically placing a territory for at least one opponent of the first player adjacent to the territory of the first player, responsive to selection by the first player of the at least one opponent for association with territory adjacent to the territory of the first player.

4. The computer-implemented method of claim 1, further comprising placing a territory for a guild controlled by a plurality of players adjacent to the territory of the first player, responsive to the first player selecting the guild.

5. The computer-implemented method of claim 4, wherein the guild is controlled by the first player and at least one in-game friend of the first player.

6. The computer-implemented method of claim 4, wherein the plurality of players controlling the guild includes at least one in-game opponent of the first player.

7. The computer-implemented method of claim 1, further comprising placing a plurality of territories adjacent to the territory of the first player in the virtual world, at least one of the plurality of territories comprising a contested territory.

8. The computer-implemented method of claim 1, wherein at least one of a plurality of territories adjacent to the territory is a territory for a non-player character.

9. The computer-implemented method of claim 1, further comprising determining that the first player has entered the territory for the at least one other selected player by crossing a boundary common to the territory for the first player and the territories for the at least one other selected player.

10. The computer-implemented method of claim 9, further comprising automatically assigning at least one in-game task to the first player responsive to determining that the first player has entered the territory for the at least one other selected player.

11. The computer-implemented method of claim 1, wherein a boundary of the territory for the first player and a boundary of the territory for the at least one other selected player is separated by unoccupied territory.

12. The method of claim 1, wherein the defined set of the one or more other players is also determined from one or more out-of-game relationships between the first player and the one or more other players in an out-of-game social network, the out-of-game social network operating independently from the multiplayer game.

13. The method of claim 1, wherein the set of one or more territories for players accessible to the first player in the first layout of territories in the virtual world is not equal to the set of one or more territories for players accessible to each of the one or more other players in the second layout of territories in the virtual world.

14. The method of claim 1, wherein the territory of the first player is fixed in the common game board layout for the duration of the game for the first player.

15. A system comprising:
a processor; and
a plurality of instructions executable with the processor to provide a placement module, the processor-implemented placement module configured to:
place a territory for a first player of a computer-implemented multiplayer game in a virtual world for the multiplayer game, wherein a placement location of the territory for the first player is determined by the placement module independent of input from any player of the multiplayer game, wherein the virtual world comprises a plurality of territories arranged in a common game board layout for respective players of the multiplayer game;
receive input from the first player in an interface of the computer-implemented multiplayer game, the input indicating selection of at least one other selected player from a defined set of one or more other players for association with territory adjacent to the territory of the first player; and
place a territory for the at least one other selected player adjacent to the territory of the first player in the virtual world, wherein a placement of the territory for the at least one other selected player shares at least one common boundary with the territory for the first player, and wherein a placement location of the territory for the at least one other selected player is determined by the placement module independent of input from any player of the multiplayer game;
wherein a first layout of accessible territories in the virtual world generated for the first player in the multiplayer game is unique to the first player, wherein a set of territories for the one or more other players accessible to the first player in the first display layout of accessible territories in the virtual world is determined from in-game relationships established between the first player and the one or more other players, wherein the territory for the first player in the virtual world is inaccessible to players without an in-game relationship with the first player;
wherein a second layout of accessible territories in the virtual world respectively generated for each of the at least one other selected player in the multiplayer game is unique to each of the at least one other selected player, wherein a set of territories accessible to each of the at least one other selected player in the second layout of accessible territories in the virtual world is determined respectively from in-game relationships established between the at least one other selected player and the one or more other players; and
wherein the second layout of accessible territories in the virtual world generated for each of the at least one other selected player provides placements in the virtual world that are consistent with the first layout of accessible territories in the virtual world generated for the first player, based on the common game board layout of the virtual world.

16. The system of claim 15, wherein the at least one other selected player includes an in-game friend of the first player.

17. The system of claim 16, wherein the placement module is further configured to automatically place a territory for at least one opponent of the first player adjacent to the territory of the first player, responsive to selection by the first player of the at least one opponent for association with territory adjacent to the territory for the first player.

18. The system of claim 15, wherein the placement module is further configured to place a territory for a guild controlled by a plurality of players adjacent to the territory of the first player, responsive to the first player selecting the guild.

19. The system of claim 18, wherein the guild is controlled by the first player and at least one in-game friend of the first player.

20. The system of claim 18, wherein the plurality of players controlling the guild includes at least one in-game opponent of the first player.

21. The system of claim 15, wherein the placement module is further configured to place a plurality of territories adjacent to the territory of the first player in the virtual world, at least one of the plurality of territories comprising a contested territory.

22. The system of claim 15, wherein at least one of a plurality of territories adjacent to the territory is a territory for a non-player character.

23. A non-transitory computer readable storage medium storing at least one program that, when executed by at least one processor, causes the at least one processor to perform operations comprising:
- placing a territory for a first player of a computer-implemented multiplayer game in a virtual world for the multiplayer game, wherein a placement location of the territory for the first player is determined by the placement module independent of input from any player of the multiplayer game, wherein the virtual world comprises a plurality of territories arranged in a common game board layout for respective players of the multiplayer game;
- receiving input from the first player in an interface of the computer-implemented multiplayer game, the input indicating selection of at least one other selected player from a defined set of one or more other players to associate the first player with territory adjacent to the territory of first player; and
- placing a territory for at least one other selected player adjacent to the territory of the first player in the virtual world, wherein a placement of the territory for the at least one other selected player shares at least one common boundary with the territory for the first player, and wherein a placement location of the territory for the at least one other selected player is determined by the placement module independent of input from any player of the multiplayer game;
- wherein a first layout of accessible territories in the virtual world generated for the first player in the multiplayer game is unique to the first player, wherein a set of territories for the one or more other players accessible to the first player in the first layout of accessible territories in the virtual world is determined from in-game relationships established between the first player and the one or more other players, wherein the territory for the first player in the virtual world is inaccessible to players without an in-game relationship with the first player;
- wherein a second layout of accessible territories in the virtual world respectively generated for each of the at least one other selected player in the multiplayer game is unique to each of the at least one other selected player, wherein a set of territories accessible to each of the at least one other selected player in the second layout of accessible territories in the virtual world is determined respectively from in-game relationships established between the at least one other selected player and the one or more other players; and
- wherein the second layout of accessible territories in the virtual world generated for each of the at least one other selected player provides placements in the virtual world that are consistent with the first layout of accessible territories in the virtual world generated for the first player, based on the common game board layout of the virtual world.

* * * * *

UNITED STATES PATENT AND TRADEMARK OFFICE
CERTIFICATE OF CORRECTION

PATENT NO. : 8,936,513 B2  
APPLICATION NO. : 13/244754  
DATED : January 20, 2015  
INVENTOR(S) : Wang et al.

Page 1 of 1

It is certified that error appears in the above-identified patent and that said Letters Patent is hereby corrected as shown below:

Title page, in column 2, References Cited under "Other Publications", line 1, delete "Encylopedia." and insert --Encyclopedia.--, therefor On Title page 2, in column 1, References Cited under "Other Publications", line 23, delete "Encylopedia." and insert --Encyclopedia.--, therefor On Title page 2, in column 1, References Cited under "Other Publications", line 37, delete "Liquidpedia" and insert --Liquipedia--, therefor On Title page 2, in column 1, References Cited under "Other Publications", line 40, delete "Liquidpedia" and insert --Liquipedia--, therefor On Title page 2, in column 2, References Cited under "Other Publications", line 51, delete "Seettings" and insert --Settings--, therefor In the Claims In column 12, line 21, in Claim 15, after "first", delete "display", therefor Signed and Sealed this  
Sixteenth Day of June, 2015

Michelle K. Lee  
*Director of the United States Patent and Trademark Office*